United States Patent [19]
Ohmori et al.

[11] Patent Number: 5,715,122
[45] Date of Patent: Feb. 3, 1998

[54] MAGNETIC HEAD

[75] Inventors: Hiroyuki Ohmori; Tetsuya Yamamoto, both of Kanagawa; Yasunari Sugiyama, Tokyo; Mitsuharu Shouji, Kanagawa, all of Japan

[73] Assignee: Sony Corporation, Tokyo, Japan

[21] Appl. No.: 698,769

[22] Filed: Aug. 16, 1996

Related U.S. Application Data

[63] Continuation of Ser. No. 352,724, Dec. 2, 1994, abandoned.

[30] Foreign Application Priority Data

Dec. 10, 1993 [JP] Japan ..................... 5-341712

[51] Int. Cl.$^6$ ................. G11B 5/17; G11B 5/127; G11B 5/23
[52] U.S. Cl. ................. 360/123; 360/119; 360/125
[58] Field of Search ................. 360/123, 125, 360/110, 119, 122, 126, 127

[56] References Cited

U.S. PATENT DOCUMENTS

| | | | |
|---|---|---|---|
| 4,151,574 | 4/1979 | Gerkema et al. | 360/113 |
| 4,642,716 | 2/1987 | Wakabayashi et al. | 360/104 |
| 4,701,820 | 10/1987 | McClure | 360/125 |
| 4,774,755 | 10/1988 | Yoshisato et al. | 29/603 |
| 4,796,132 | 1/1989 | Dekura et al. | 360/113 |

FOREIGN PATENT DOCUMENTS

| | | |
|---|---|---|
| A-0 233 086 | 8/1987 | European Pat. Off. |
| A-0 614 173 | 9/1994 | European Pat. Off. |
| A-37 17 552 | 12/1988 | Germany |

OTHER PUBLICATIONS

Patent Abstracts of Japan, vol. 016, No. 046 (P-1307), Feb. 5, 1992 and JP-A-03 248305 (Sanyo Electric Co. Ltd.), Nov. 6, 1991.
Patent Abstracts of Japan, vol. 017, No. 519 (P-1615), Sep. 17, 1993 and JP-A-05 135319 (Canon Electric Inc.), Jun. 1, 1993.
Patent Abstracts of Japan, vol. 010, No. 007 (P-419) and JP-A-60 163217 (Kiyanon Denshi KK), Aug. 26, 1985.
Patent Abstracts of Japan, vol. 013, No. 017 (P-813), Jan. 17, 1989 and JP-A-63 220 407 (Hitachi Ltd.), Sep. 13, 1988.
Patent Abstracts of Japan, vol. 002, No. 088 (E-039), Jun. 17, 1978 and JP-A-53 042019 (Hitachi Ltd.), Apr. 17, 1978.
Patent Abstracts of Japan, vol. 006, No. 042 (P-098), Mar. 16, 1982 and JP-A-56 160014 (Seikoushiya K.K.), Dec. 9, 1981.

*Primary Examiner*—Stuart S. Levy
*Assistant Examiner*—William J. Klimowicz
*Attorney, Agent, or Firm*—Hill, Steadman & Simpson

[57] ABSTRACT

A magnetic head with which electrical connection between the terminals of the head and other devices is easy, which is suitable for the mass production of magnetic recording/reproducing equipment and which is highly reliable comprises a pair of bases facing each other, a thin film coil formed on at least one of the bases, and a terminal portion connected to the thin film coil formed on the same base; a portion of the other base is cut away and the terminal portion is exposed at this cutaway portion and the terminal portion is formed at the cutaway portion on a surface intersecting the main surface of the magnetic head at an obtuse angle.

3 Claims, 19 Drawing Sheets

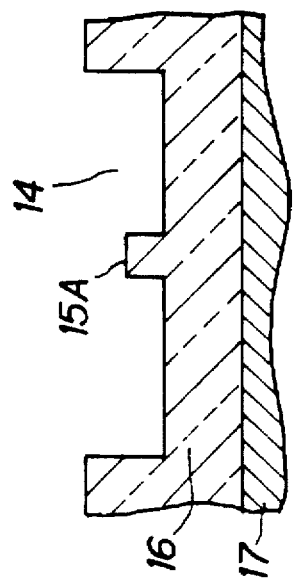
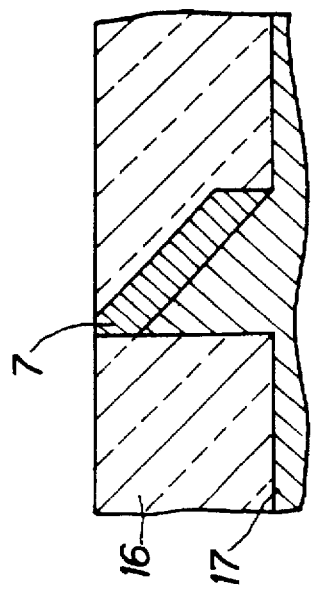
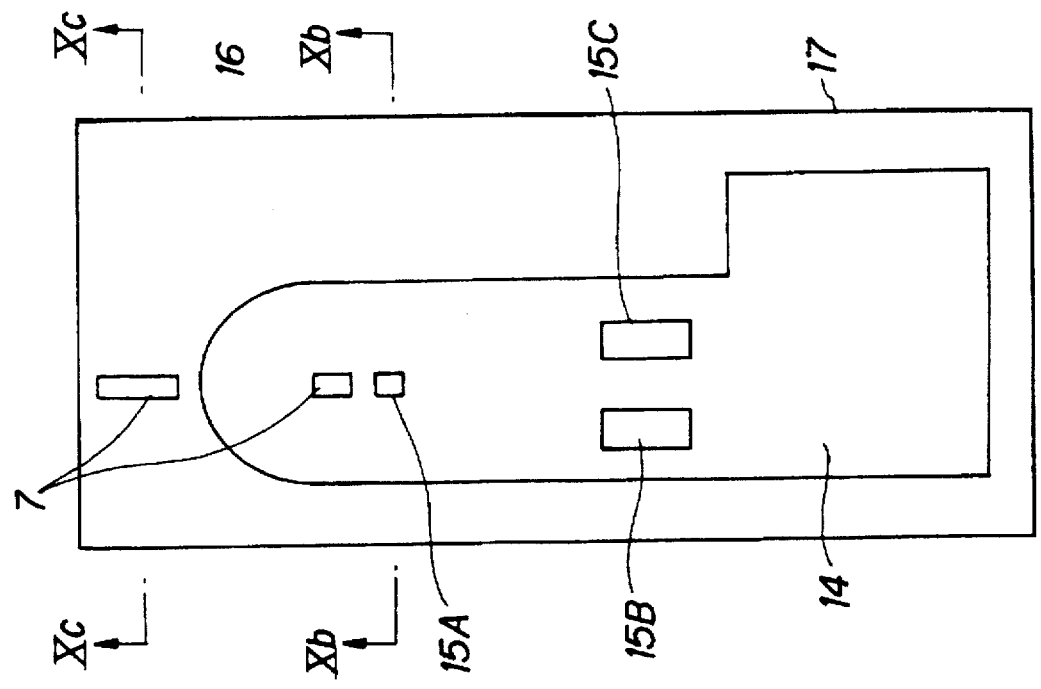

MAGNETIC HEAD

This is a continuation of application Ser. No. 08/352,724, filed Dec. 2, 1994, now abandoned.

BACKGROUND OF THE INVENTION

This invention relates to a magnetic head and to for example a magnetic head suitable for a video tape recorder or a magnetic disk unit.

In magnetic recording and reproducing devices such as video tape recorders (VTRs), digital recording, wherein signals are digitized before being recorded in order to improve the picture quality, is being advanced, and recording densities and recording frequencies are being increased to realize this digital recording.

With the adoption of higher densities and frequencies of magnetic recording, high output at high frequencies and low noise is required of magnetic heads used for recording and reproduction. For example, with a so-called compound metal-in-gap head which is widely used as a magnetic head for VTRs and comprises a ferrite material coated with a metallic magnetic film and wire-wound, the inductance of the head is high and because of output reduction due to the inductance the output of the head in high frequency regions is low and consequently it is difficult to achieve satisfactory digital image recording, which requires high frequency and high density, with this type of head.

In view of this, the use of so-called thin film magnetic heads made by thin film forming processes as magnetic heads capable of handling high frequencies has been being studied.

A thin film magnetic head is made by forming a coil in a spiral shape on a ceramic substrate using a thin film forming method such as photolithography and forming a protective film of an oxide such as alumina thereon. One terminal extending from the coil and the another terminal electrically connected to the coil are left exposed without any protective film being formed thereon.

Particularly in manufacturing a magnetic head for a VTR, in order to stabilize the sliding characteristics between the magnetic head and the magnetic tape it is preferable that a substrate made of the same material as the ceramic substrate be affixed to the magnetic head after it is formed or that a pair of magnetic head halves made by thin film forming processes be adhered together at the magnetic gap portion. In this case, the terminals can be exposed at the end surface of the magnetic head after the magnetic head is made by the length dimension of the magnetic head half on the side where terminals were formed being made smaller than the length dimension of the other magnetic head half.

In the case of a magnetic head for a VTR, it is usual for the magnetic head (the head tip) to be adhered to a head mounting base. FIG. 1 shows a magnetic head made in the way described above adhered to a head mounting base.

Bonding pads 65 and 66 are provided on the main surface (the surface to which the magnetic head is adhered) 64a of a head mounting base 64, and the terminals 75 and 76 of the magnetic head 71 are electrically connected to the bonding pads 65 and 66. For these connections, for example wire bonding using bonding wires 67 and 68 is preferable because of its suitability for mass production.

However, because the main surface 64a of the head mounting base 64 and the terminal exposing face 72a of the magnetic head half 72 are mutually orthogonal, as can be seen in FIG. 2 which is an enlarged partial rear view of FIG. 1, it is difficult to connect the terminals 75 and 76 with the bonding pads 65 and 66 by wire bonding, and there are problems from the mass production and reliability points of view. Consequently, this connection has to be performed by soldering.

SUMMARY OF THE INVENTION

This invention was devised in view of the problems described above, and an object of the invention is to provide a magnetic head with which electrical connection between the terminals and other devices is easy, which is suitable for the mass production of magnetic recording/reproducing equipment and which is highly reliable.

This invention is a magnetic head comprising a pair of bases facing each other wherein a thin film coil is formed on at least one of the bases, a terminal portion connected to the thin film coil is formed on this base, a portion of the other base is cut away and the terminal portion is exposed at this cutaway portion, and the terminal portion is formed at the cutaway portion on a surface intersecting the main surface of the magnetic head at an obtuse angle.

In the invention, it is preferable that the surface on which the terminal portion is formed and the magnetic gap forming surfaces be in the same plane.

Also, it is preferable that a thin film coil be formed on each of the bases.

A magnetic head according to this invention is especially suitable for use as a magnetic head for azimuth recording.

BRIEF DESCRIPTION OF THE DRAWINGS

FIG. 12A is a perspective view of the substrate, and FIG. 12B is an enlarged view of the portion $IX_b$ of FIG. 12A;

FIGS. 13A to 13C show the magnetic head half of FIG. 12B; FIG. 13A is an enlarged plan view, FIG. 13B is an enlarged sectional view on the line $X_b$—$X_b$ of FIG. 13A, and FIG. 13C is an enlarged sectional view on the line $X_c$—$X_c$ of FIG. 13A;

FIG. 14A is an enlarged plan view, and FIG. 14B is an enlarged sectional view on the line $XI_b$—$XI_b$ of FIG. 14A;

FIG. 15A is an enlarged plan view, and FIG. 15B is an enlarged sectional view on the line $XII_b$—$XII_b$ of FIG. 15A;

FIG. 16A is an enlarged plan view, and FIG. 16B is an enlarged sectional view on the line $XIII_b$—$XIII_b$ of FIG. 16A;

FIG. 17A is an enlarged plan view, and FIG. 17B is an enlarged sectional view on the line $XIV_b$—$XIV_b$ of FIG. 17A;

FIG. 18A is an enlarged plan view, and FIG. 18B is an enlarged sectional view on the line $XV_b$—$XV_b$ of FIG. 18A;

DETAILED DESCRIPTION OF THE PREFERRED EMBODIMENTS

A preferred embodiment of the invention will now be described.

Figure 4:
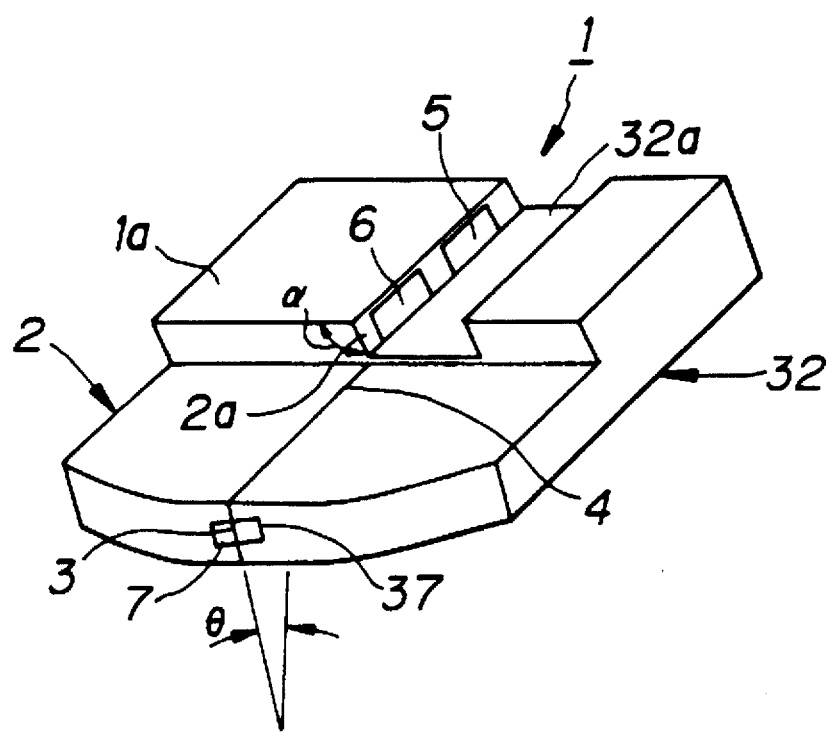
FIG. 4 is a partial enlarged plan view of a magnetic head of a preferred embodiment of the invention.

FIG. 4 is an enlarged perspective view of a magnetic head. The magnetic head 1 is for azimuth recording, and consists of a pair of magnetic head halves 2 and 32 (hereinafter referred to simply as "head halves") adhered to each other at magnetic gap surfaces 4. A region of the head half 32 extending to the surface contacting the head half 2 is cut away, the end surface 2a of the head half 2 is exposed at the cutaway portion 32a thus formed, and terminals 5 and 6 are exposed on the end surface 2a. The reference numbers 7 and 37 denote magnetic layers provided in the head halves 2 and 32.

The magnetic gap 3 slants at an azimuth angle θ with respect to a plane orthogonal to the main surface 1a of the magnetic head, and the end surface 2a of the head half 2 lies in the same plane as the magnetic gap surfaces 4. Therefore, the terminals 5 and 6 formed on the end surface 2a lie in a plane crossing the main surface 1a of the magnetic head (the horizontal plane in the figure) at an obtuse angle α (the azimuth angle θ plus a right angle). The azimuth angle θ of for example a magnetic head for 8 mm video use is 10 degrees.

The angle α is generally made more than 90 degrees and less than 135 degrees, from 95 to 120 degrees is preferable, and most preferably it should be an angle corresponding to the azimuth angle, for example 100 degrees. In this preferred embodiment α is 100 degrees.

Figure 5:
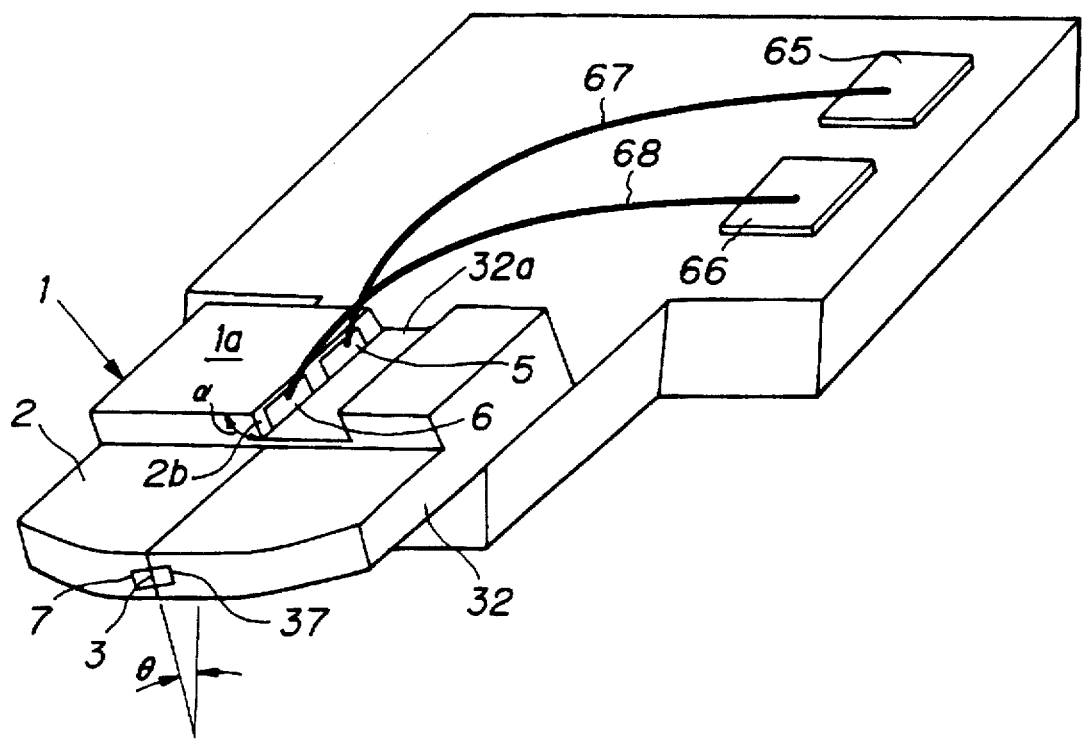
FIG. 5 is an enlarged perspective view of the same magnetic head and a head mounting base.

As a result of this choice of the angle α, the operation of with the bonding wires 67 and 68 wire-bonding the terminals 5 and 6 of the magnetic head 1 to the bonding pads 65 and 66 on the head mounting base 64 to which the magnetic head 1 is adhered becomes easy and suitable for mass production, as shown in FIG. 5. This angle α also improves the reliability of the connection made by the bonding wires 67 and 68. The head mounting base 64 is provided with a rotary transformer not shown in the drawings.

Figure 1:
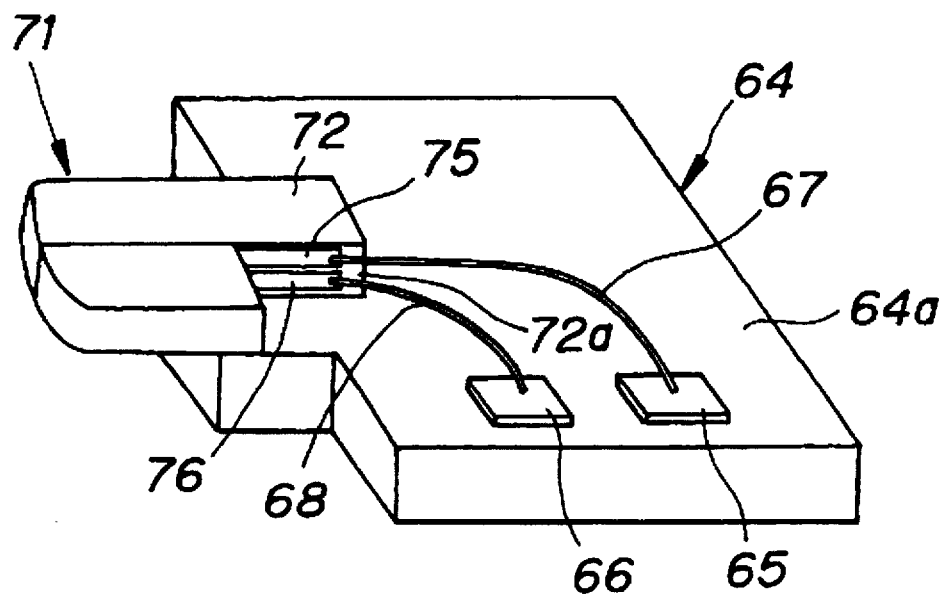
FIG. 1 is an enlarged perspective view of an example of a conventional magnetic head.
Figure 2:
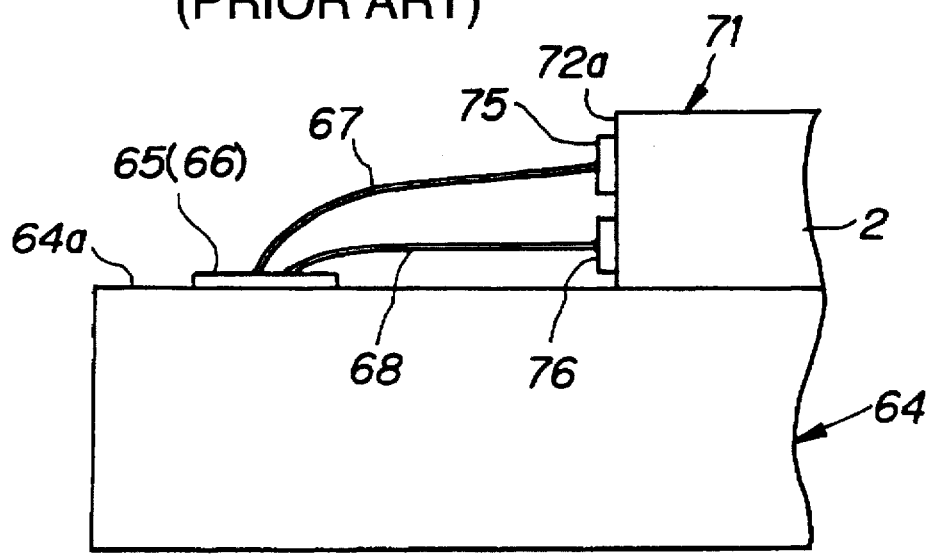
FIG. 2 is an enlarged partial rear view of the magnetic head and head mounting base of the conventional example.
Figure 3:
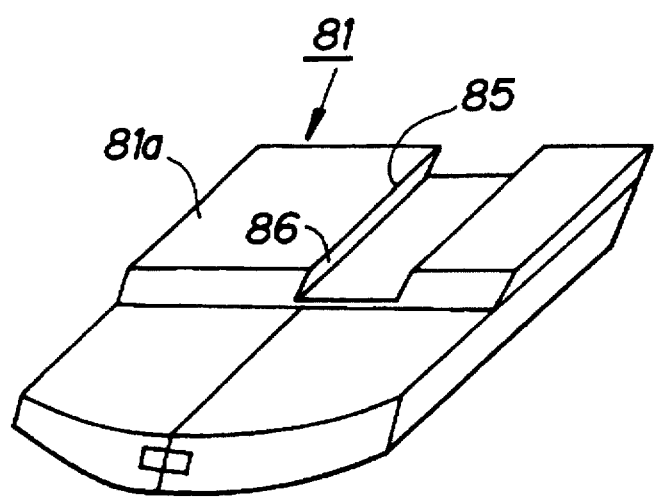
FIG. 3 is an enlarged perspective view of a magnetic head of a comparison example.

(As shown in FIG. 3, when an end surface on which terminals 85 and 86 are formed intersects a main surface 81a of a magnetic head 81 at an acute angle, it becomes difficult for a capillary and a wedge to reach the terminals 85 and 86, and the bonding operation becomes more difficult than in the example of FIG. 2 described above.)

The magnetic head of this preferred embodiment is manufactured by the steps shown in FIG. 6 through FIG. 22.

Figure 6:
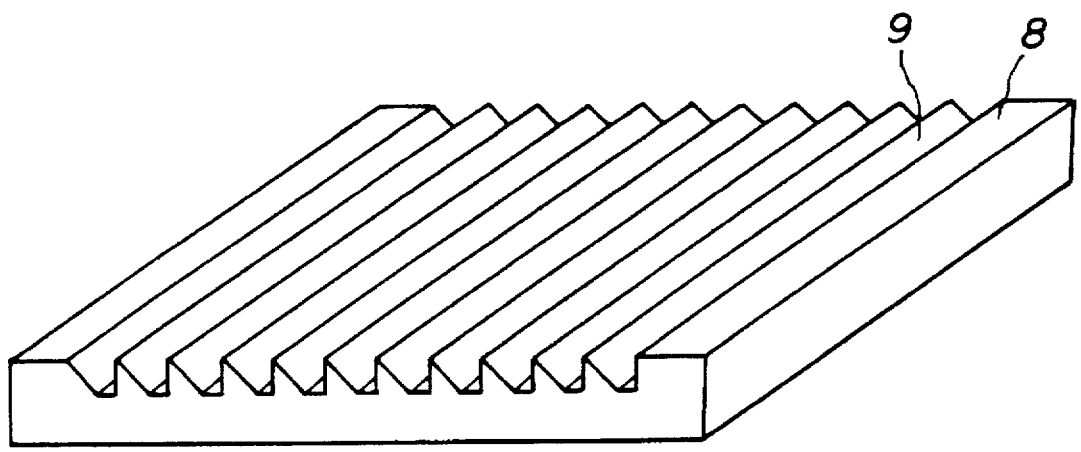
FIG. 6 is a perspective view of a substrate provided with grooves for forming a layered magnetic film.

First, as shown in FIG. 6, grooves 9 for forming a sloping films are formed in the surface of a ceramic substrate 8.

Figure 7:
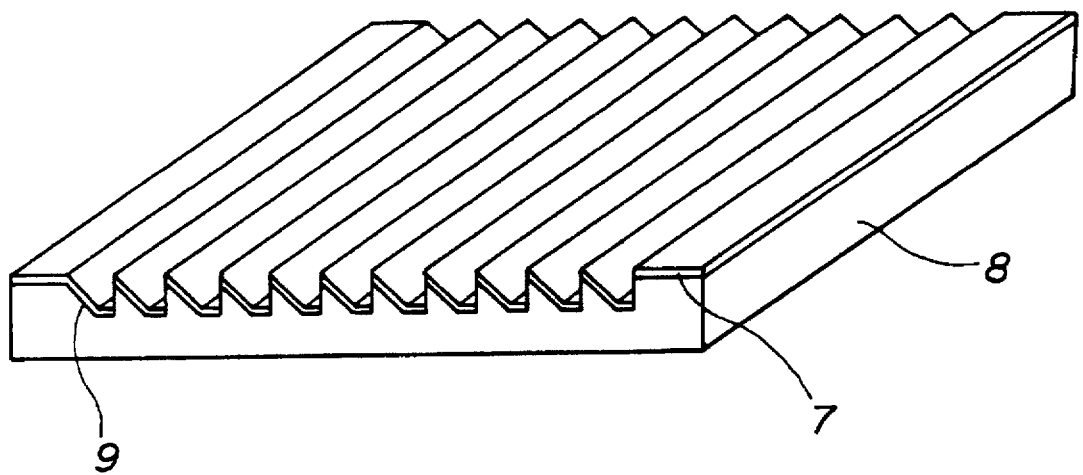
FIG. 7 is a perspective view of the substrate with the layered magnetic film formed thereon.

Then, as shown in FIG. 7, a magnetic layer 7 is formed. In this step, if necessary, a base film of an oxide or metal (for example a film of alumina) may be formed to improve the adherence and magnetic characteristics of the magnetic layer, and a protective layer (for example a chromium film) may be formed to prevent reaction with a filler (glass) which is filled into the grooves in a succeeding step.

Figure 8:
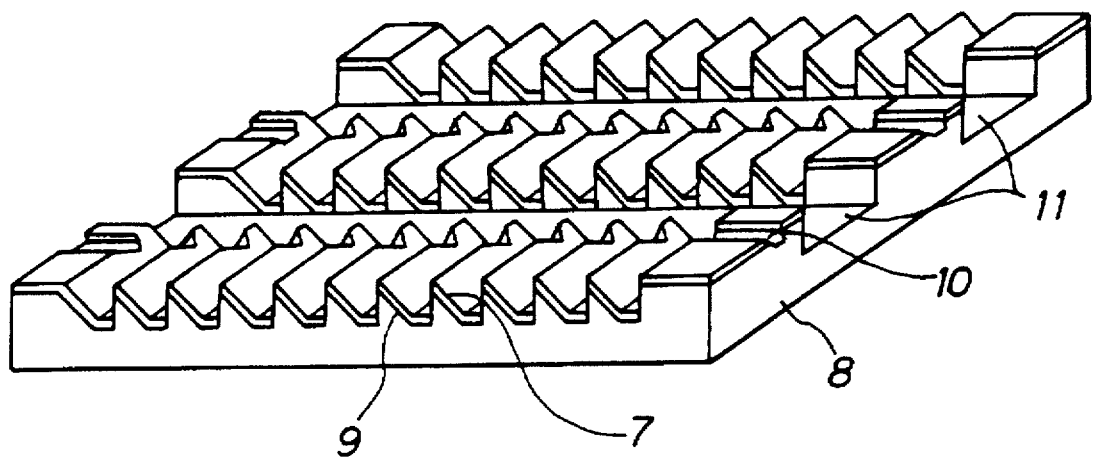
FIG. 8 is a perspective view of the substrate provided with grooves for forming a thin film coil.

Next, as illustrated in FIG. 8, grooves 10 for forming thin film coils and grooves 11 which remove portions of the magnetic layer unnecessary for forming the magnetic paths are cut in a direction orthogonal to the grooves 9.

Figure 9:
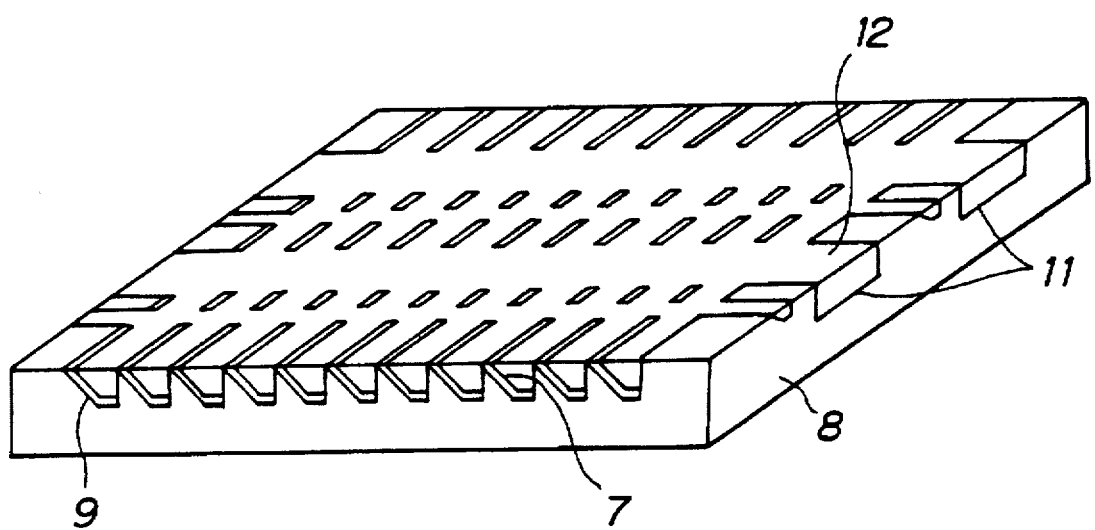
FIG. 9 is a perspective view of the substrate with the grooves filled with glass.

Next, as shown in FIG. 9, the grooves are filled with glass 12, and unnecessary glass is removed if necessary.

Figure 10:
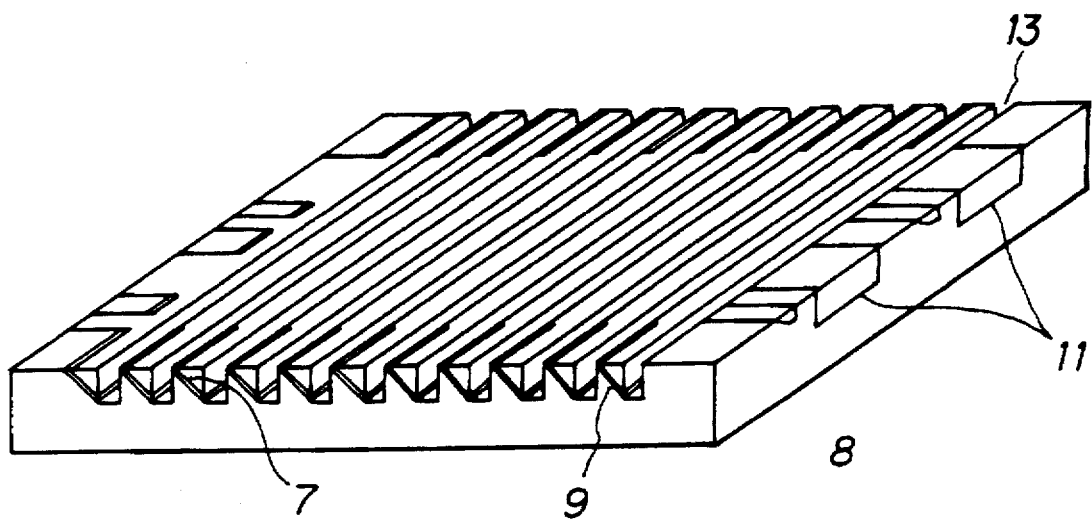
FIG. 10 is a perspective view of the substrate provided with grooves for regulating the track width.

Then, as shown in FIG. 10, portions of the magnetic layer in the vicinity of the magnetic gaps are removed, and grooves 13 for regulating the track width are formed in parallel with the grooves 9.

Figure 11:
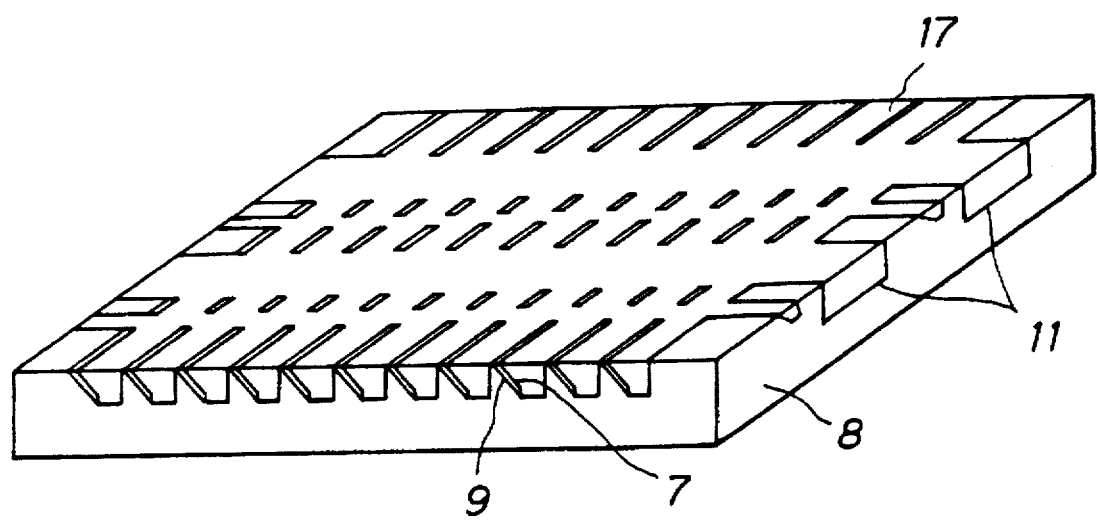
FIG. 11 is a perspective view of the substrate with the grooves for regulating the track width filled with glass.

Next, as shown in FIG. 11, the grooves 13 shown in FIG. 10 are filled with glass 17 and the surface is flattened. The remaining steps mainly consist of thin film forming processes such as photolithography and ion etching.

Figure 12A:
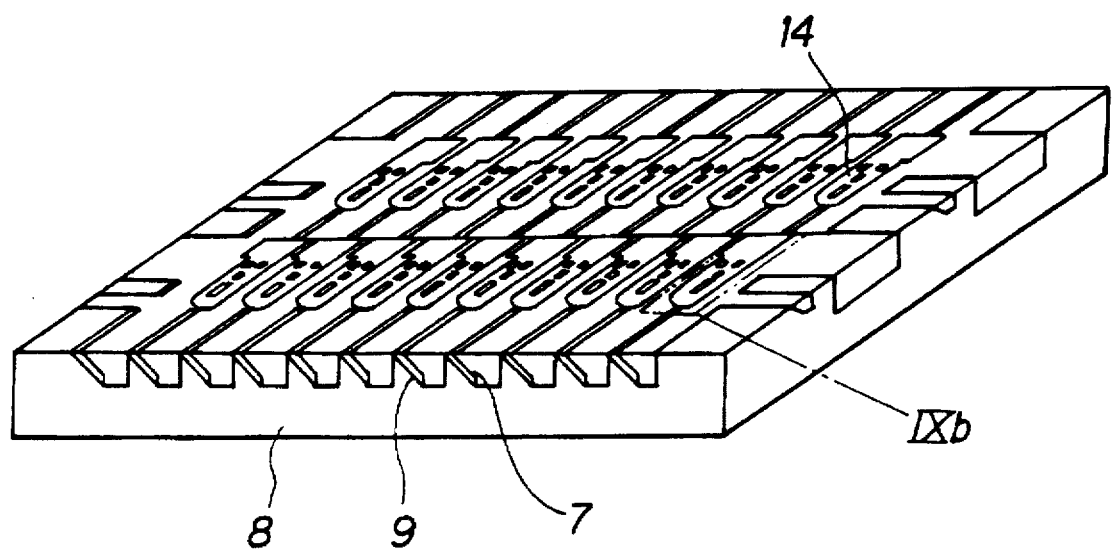
FIGS. 12A and 12B show the substrate provided with recesses for forming coil patterns.
Figure 12B:
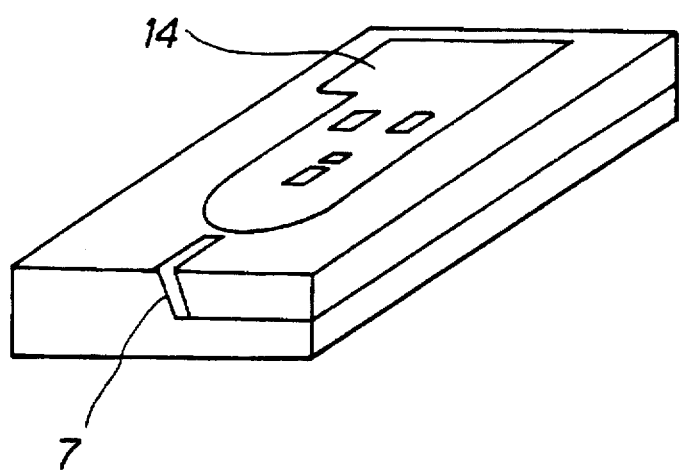

FIGS. 12A and 12B show a state wherein recesses 14 for forming thin film coils have been formed by ion etching or the like in the surface of the glass 17 filled in the step of FIG. 11; FIG. 12A is a perspective view similar to those of FIG. 6 through FIG. 11, and FIG. 12B is an enlarged view of a portion $IX_b$ (one head half) of FIG. 12A. The description of the steps of from FIGS. 13A to 13C to FIGS. 18A and 18B will be given using enlarged views corresponding to FIG. 12B.

FIG. 13A is an enlarged view of FIG. 12B. FIG. 13A is an enlarged plan view, FIG. 13B is an enlarged sectional view along the line $X_b$—$X_b$ of FIG. 13A, and FIG. 13C is an enlarged sectional view along the line $X_c$—$X_c$ of FIG. 13A. The reference numbers 15A, 15B, and 15C in the figures denote contact parts for connecting the coils after the head halves are adhered together. For connecting the coils, at least a portion of each of these contact parts 15A, 15B and 15C is positioned at a shallower level than the bottom of the recess 14. The reference number 17 denotes the substrate processed in the steps of FIG. 6 through FIG. 10.

Figure 14A:
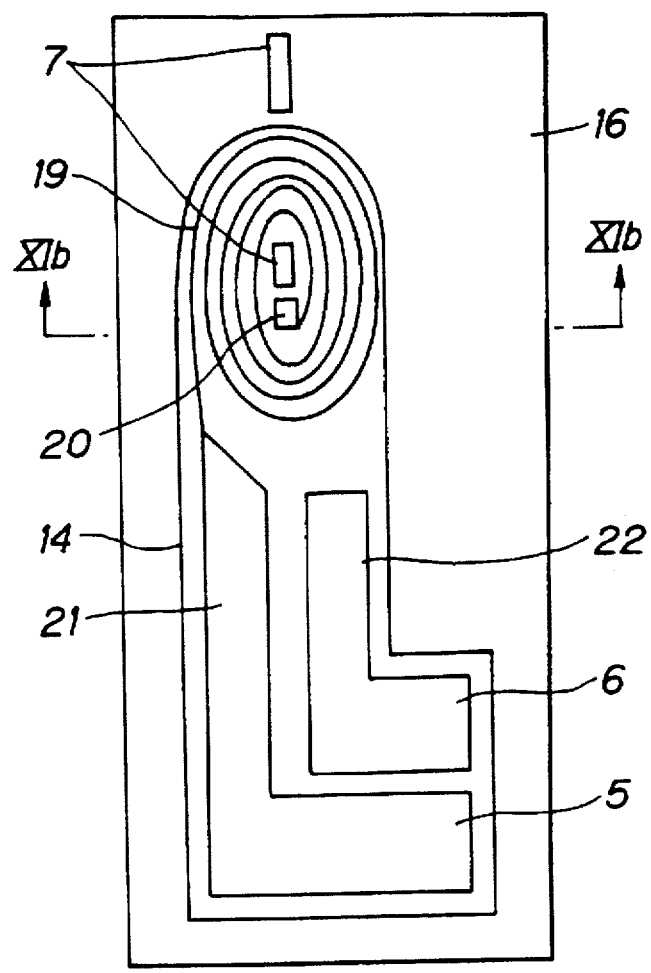
FIGS. 14A and 14B show the magnetic head half provided with coil patterns.
Figure 14B:
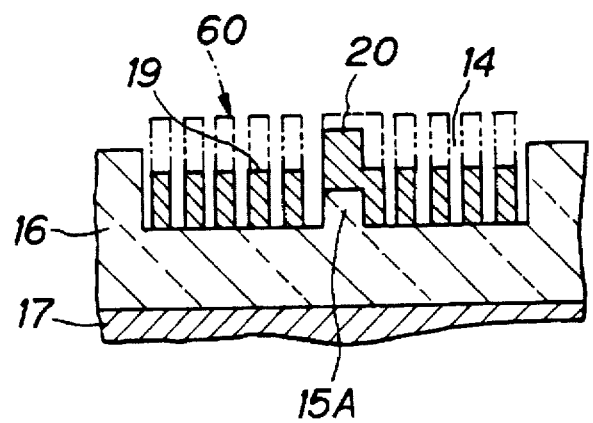

Next, as shown in FIGS. 14A and 14B, the coil pattern is formed. FIG. 14A is an enlarged plan view similar to FIG. 13A, and FIG. 14B is an enlarged sectional view along the line $XI_b$—$XI_b$ of FIG. 14A.

The coil pattern 19 is made by forming a film of conductive metal (copper) on a chromium or titanium base layer over the whole surface and then removing unnecessary portions of the film by ion etching or the like, or by masking the conductive metal in a predetermined pattern with a photoresist and then forming the coil pattern 19 by plating. Simultaneously with the formation of the coil pattern 19, a coil continuity portion 20 at the inner end thereof and terminal connection portions 21 and 22 are formed. In FIG. 14B, the reference number 60 with a broken line arrow denotes a mask for patterning.

Figure 15A:
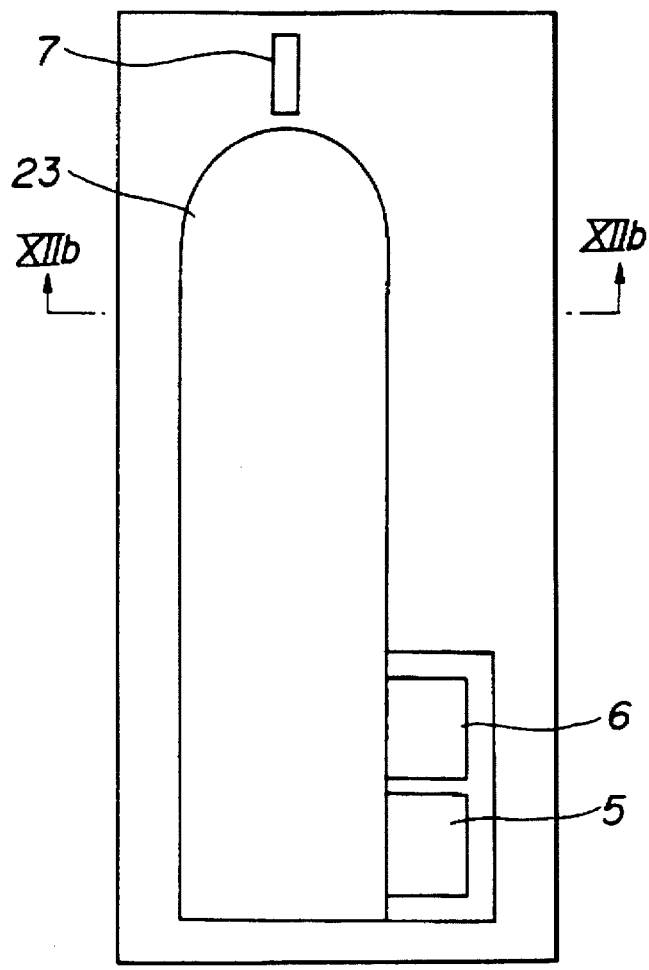
FIGS. 15A and 15B show the magnetic head half provided with a protective film on the coil patterns.
Figure 15B:
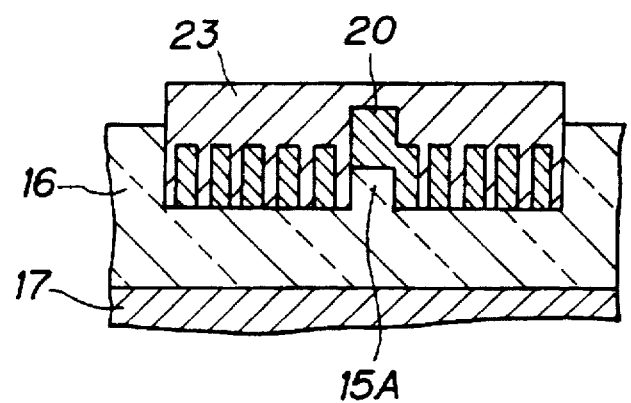

Next, as shown in FIGS. 15A and 15B, a protective film 23 for protecting the coil portion is formed over most of the area of the recess. FIG. 15A is an enlarged plan view similar to FIG. 13A, and FIG. 15B is an enlarged sectional view along the line XII$_b$—XII$_b$ of FIG. 15A.

The protective film 23 is formed by sputtering an insulative oxide (for example alumina resist) or by transforming a photoresist by heat treatment. When a photoresist is used to form the protective film, it is beneficial to leave the photoresist only on the necessary area so as to shorten the time required for the later flattening step. The terminals 5 and 6 at the far end of the terminal connection portions (21 and 22 in FIG. 14A) project from the protective film 23 and are exposed.

Figure 16A:
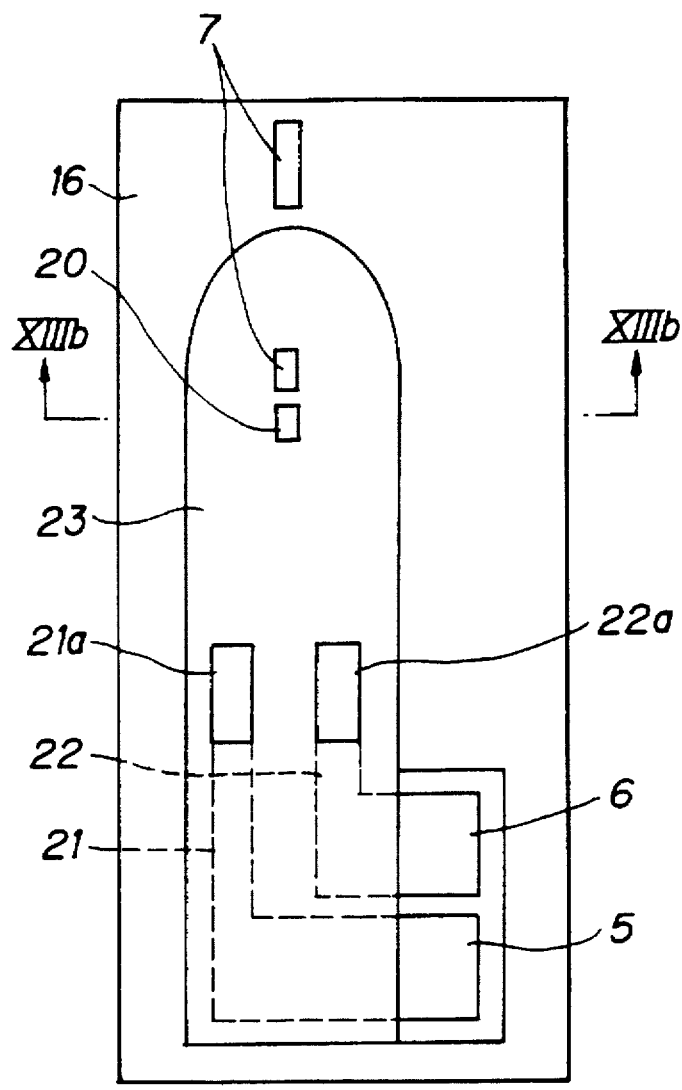
FIGS. 16A and 16B show the magnetic head half after the protective film is flattened and the connection portions exposed.
Figure 16B:
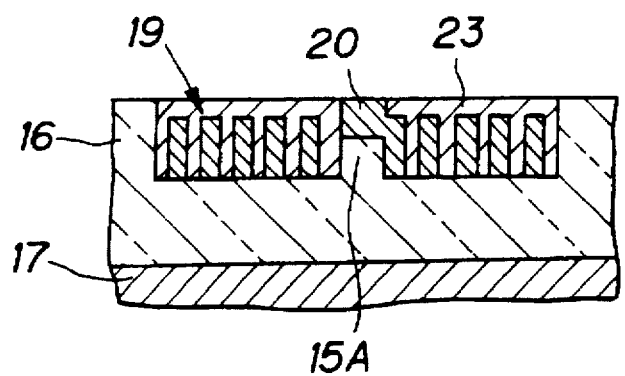

Then, as shown in FIGS. 16A and 16B, the surface is flattened by polishing. FIG. 16A is an enlarged plan view similar to FIG. 13A, and FIG. 16B is an enlarged sectional view along the line XIII$_b$—XIII$_b$ of FIG. 16A.

The above-mentioned flattening treatment exposes the coil continuity portion 20 and the terminal continuity portions 21a and 22a of the terminal connection portions 21 and 22 on the contact portions (15B and 15C of FIG. 13A).

Figure 17A:
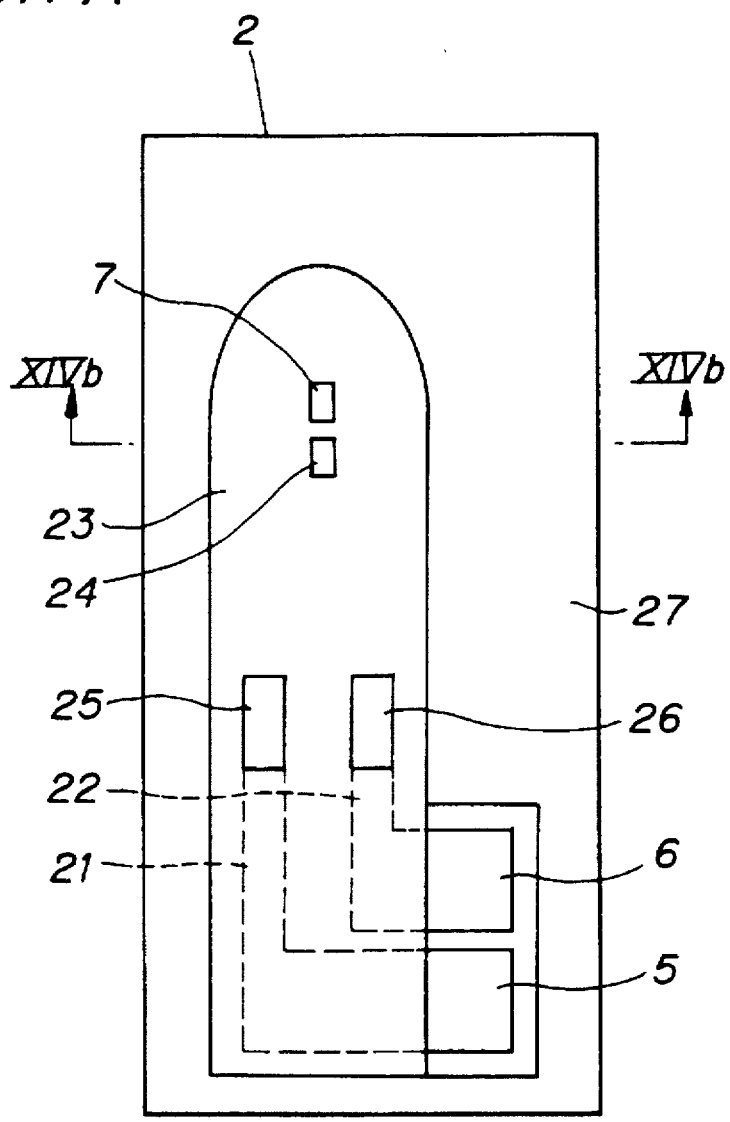
FIGS. 17A and 17B show the magnetic head half provided with a metallic film having a predetermined pattern.
Figure 17B:
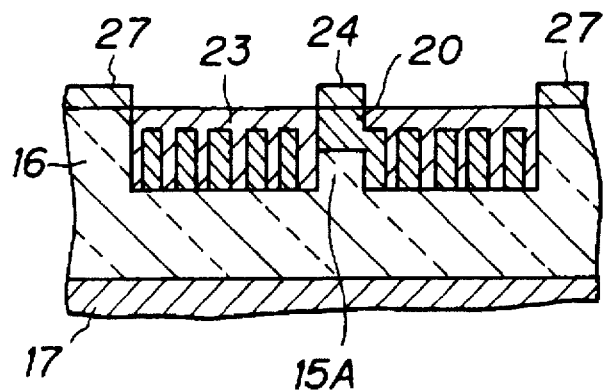

Next, as shown in FIGS. 17A and 17B, a metallic film for forming the magnetic gap is formed and this film is then patterned to form the metallic films 24, 25, 26 and 27 on the coil continuity portion 20 and the terminal continuity portions 21a and 22a of FIGS. 16A and on the area around the recess 14 of FIGS. 13A and 13B respectively. FIG. 17A is an enlarged plan view similar to FIG. 13A, and FIG. 17B is an enlarged sectional view along the line XIV$_b$—XIV$_b$ of FIG. 17A.

In this way, one of the head halves, the head half 2, is completed. The metallic films 24, 25, 26 and 27 are separate from each other and do not short-circuit during current flow through the coil pattern. When the pair of head halves are joined in the next step, it is necessary that the joining be performed at a temperature at which the coil patterns due not suffer damage such as coil breakage due to the heating process. Accordingly, the metallic film material preferably is a low melting point metal such as tin or lead or an alloy thereof, or an easily diffusing metal such as gold or an alloy thereof. To improve the adherence of the metallic film, a base layer of chromium or titanium or the like may be formed.

Figure 18A:
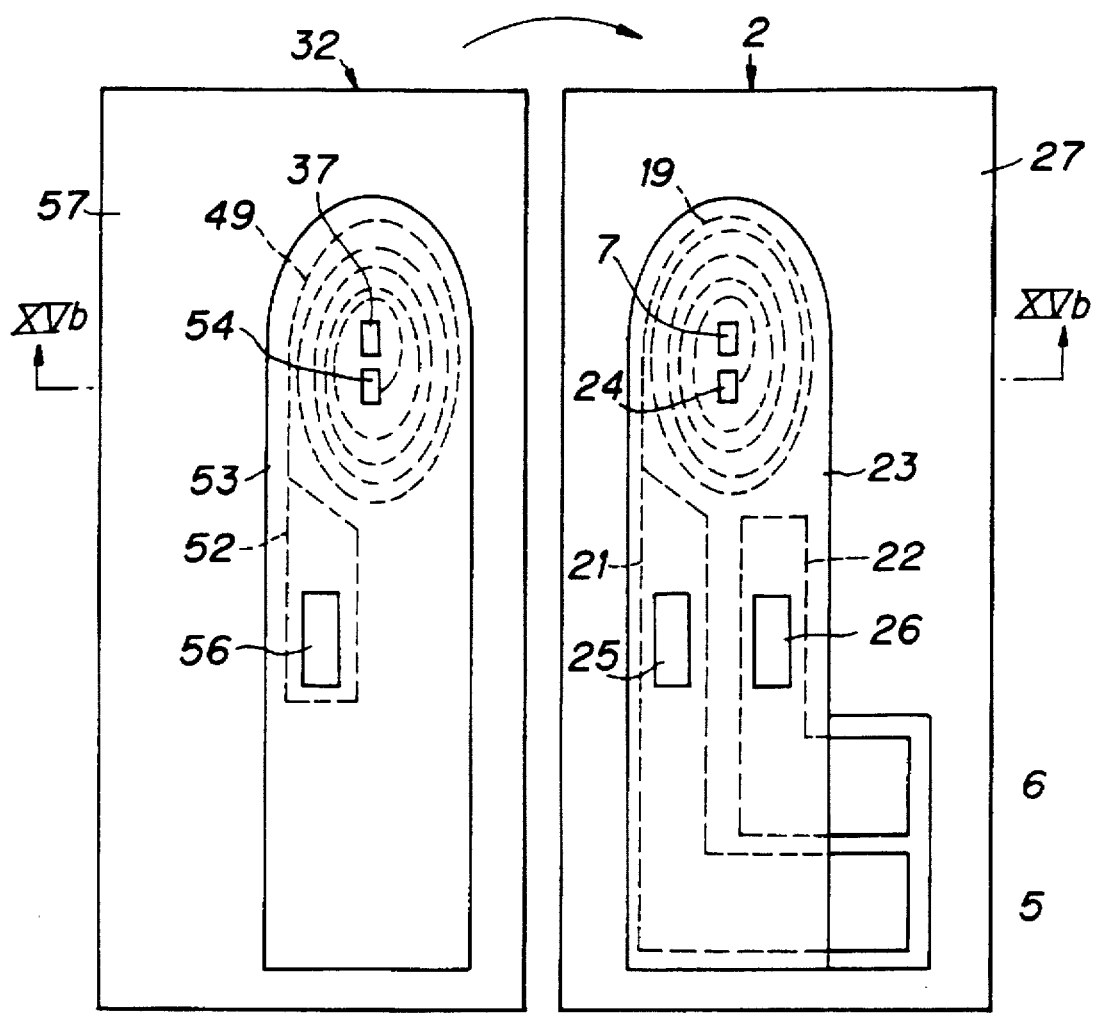
FIGS. 18A and 18B illustrate how a pair of magnetic head halves both provided with a metallic film having a predetermined pattern are affixed together.
Figure 18B:
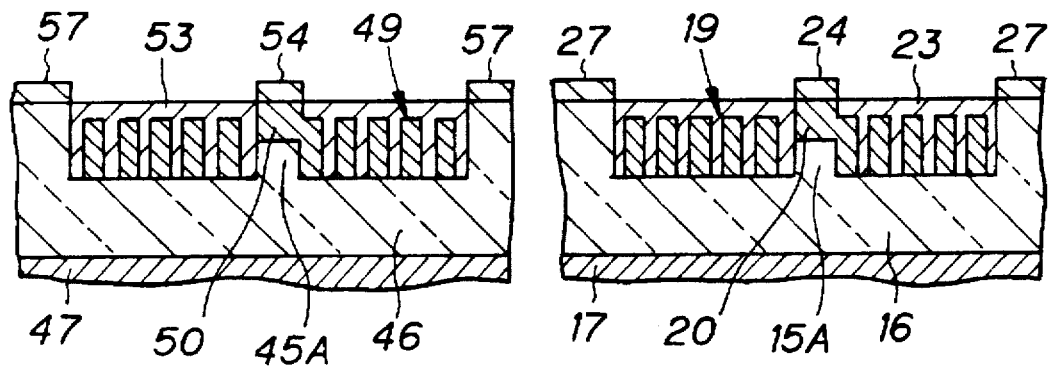

Then, as shown in FIG. 18A, the head half 2 of FIG. 17A and the other head half 32 prepared by a similar procedure are joined together as shown by the arrow to make the magnetic head. FIG. 18A is an enlarged plan view similar to FIG. 13A, and FIG. 18B is an enlarged sectional view along the line XV$_b$—XV$_b$ in FIG. 18A. The parts constituting the head half 32 are shown with reference numbers obtained by adding 30 to the reference numbers of the corresponding parts of the head half 2.

The terminal connection portion of the head half 32 consists of only a terminal connection portion 52 extending from the coil 49.

Thus, an electric current entering through the terminal 5 flows through the terminal connection portion 21, the coil pattern 19, the coil continuity portion 20, the metallic films 24 and 54, the coil continuity portion 50, the coil pattern 49, the terminal connection portion 52, the metal films 56 and 26 and the terminal connection portion 22 to the terminal 6. Current also flows in the opposite direction.

FIGS. 13A to 13C through FIGS. 18A and 18B illustrate a single head half. In practice, however, as shown in FIG. 6 through FIGS. 12A and 12B, the above-described processes are carried out on a platelike body made up of multiple head halves. FIG. 19 through FIG. 22 illustrate the above-described platelike body.

Figure 19:
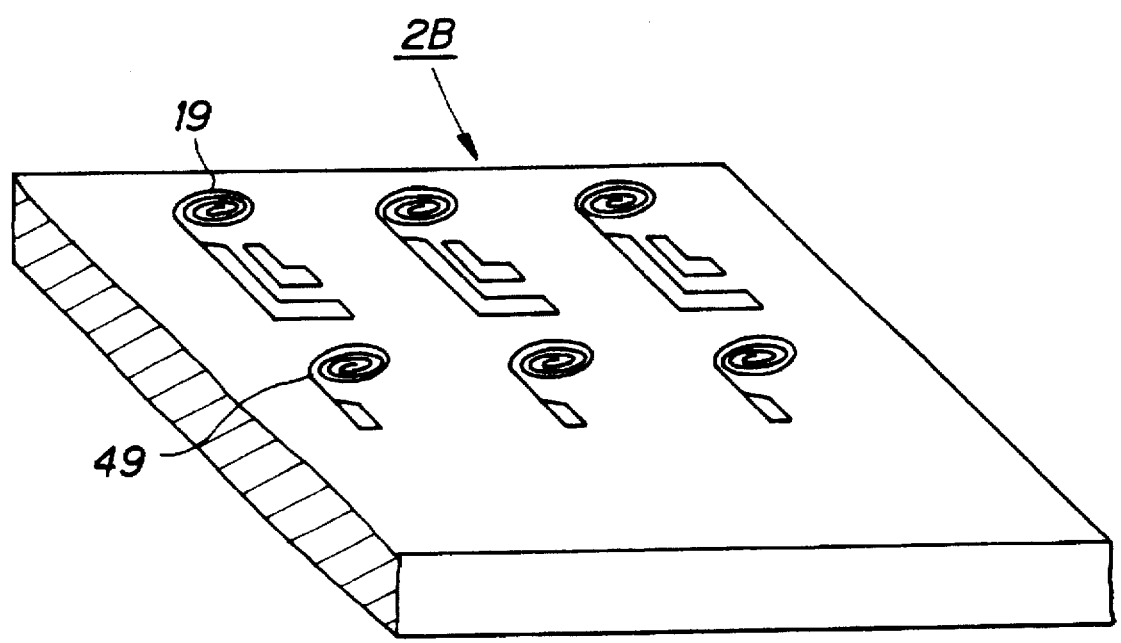
FIG. 19 is a perspective view of a plate comprising multiple magnetic head halves of FIGS. 17A and 17B.
Figure 20:
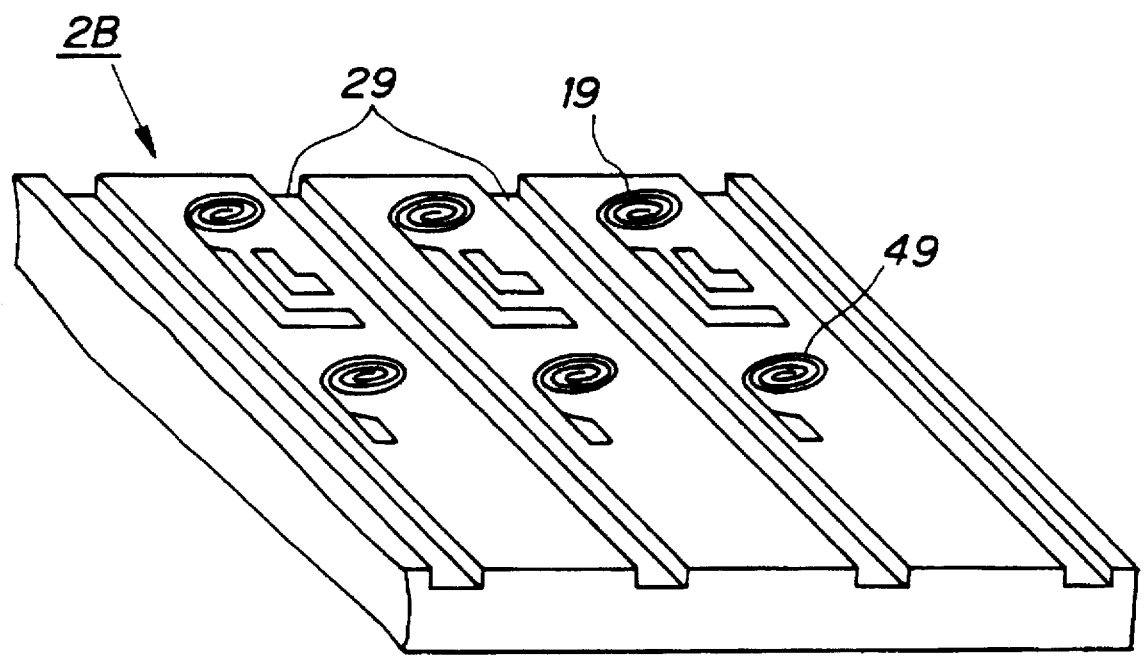
FIG. 20 is a perspective view of the plate provided with grooves for exposing the terminals.

FIG. 19 is a partial perspective view of a platelike body 2B consisting of a set of head halves 2. Grooves 29 for exposing the terminals are cut into the platelike body 2B as shown in FIG. 20. Because in the platelike body 2B shown in FIG. 19 and FIG. 20 there are two rows of head halves 2, the platelike body 2B is cut to obtain platelike bodies 2A each having a single row of the head halves.

Figure 21:
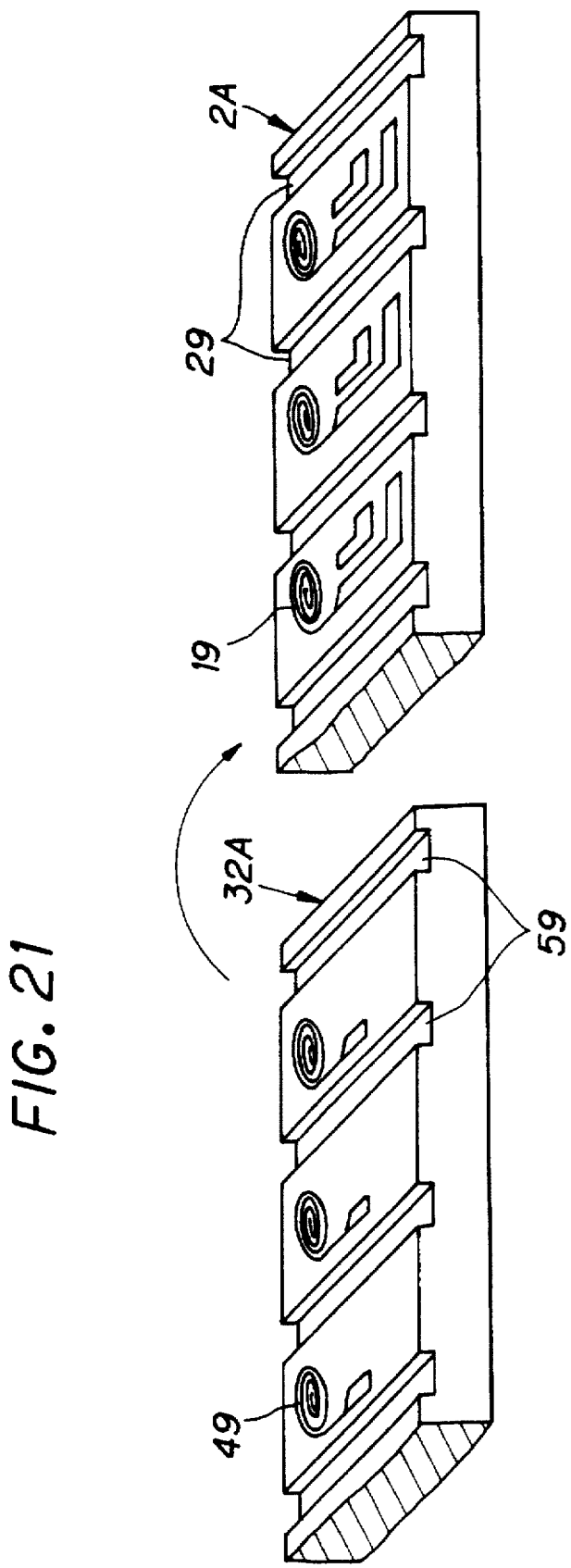
FIG. 21 is a perspective view illustrating how a pair of plates are affixed to each other.

Similarly, grooves 59 are cut in the platelike body consisting of the set of head halves 32 and this is also cut into two platelike bodies 32A each having one row of head halves 32, and the pair of plate bodies 2A and 32A are brought face to face and affixed together as shown in FIG. 21. FIGS. 18A and 18B illustrate this step for a single pair of head halves. In the step of FIG. 21, the patterns are brought to face each other with the magnetic layers meeting over the predetermined track width and are joined together by heating under pressure.

Figure 22:
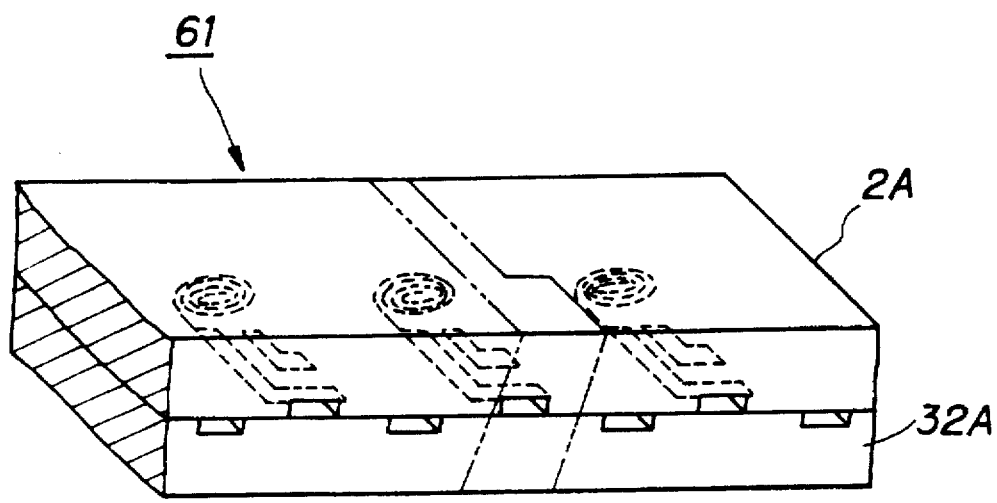
FIG. 22 is a perspective view of a block of magnetic heads made by the step illustrated in FIG. 21.
Figure 23:
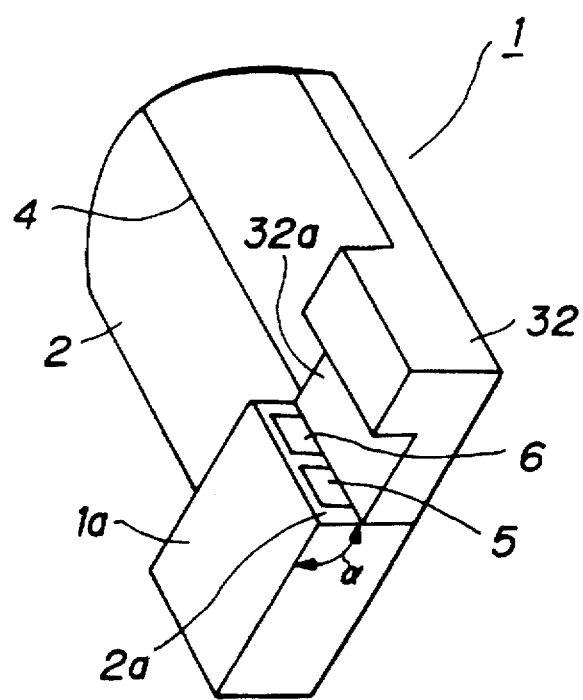
FIG. 23 is an enlarged perspective view of a magnetic head viewed from the same angle as FIG. 22.

As shown in FIG. 22, a block 61 consisting of multiple head halves thus joined together is cut out along the broken lines, cutting to form the cutaway portion and finishing is carried out, and a magnetic head 1 is thereby obtained as the finished product shown in FIG. 4. The number of turns in the thin film coil can be made high, and a large output can be obtained with 16 to 20 turns. The total number of turns of the coil patterns 19 and 49 (see FIG. 18A) in this preferred embodiment is 18.

Because the coil is formed of a thin film, the magnetic head can be made small, multiple magnetic heads can be made from one substrate as illustrated in FIG. 6 through FIG. 22, and the process is suitable for mass-production.

Figure 24:
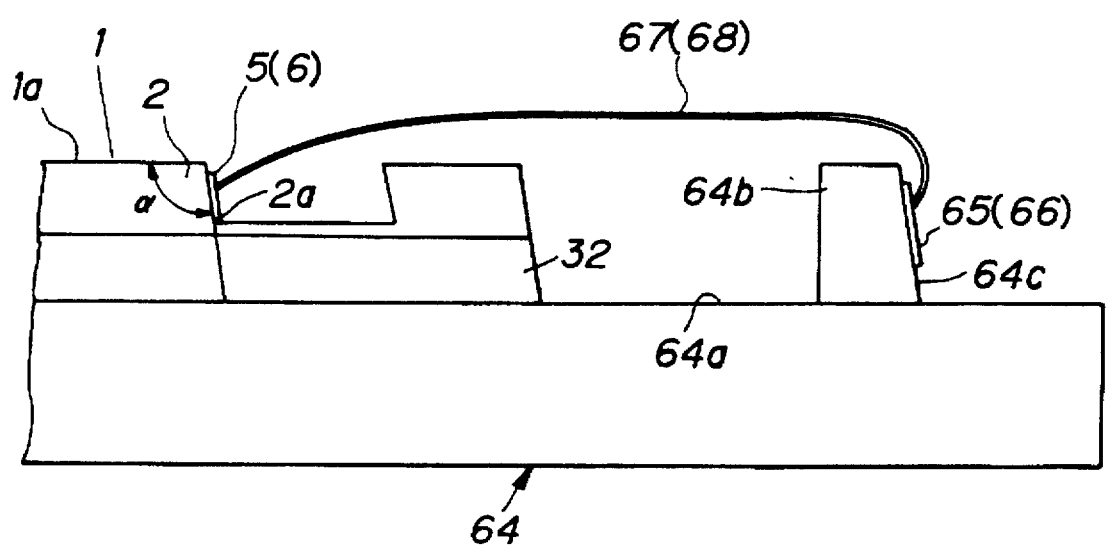
FIG. 24 is an enlarged partial side view of a magnetic head and head mounting base of another embodiment.

When the terminals of the magnetic head and the bonding pads on the head mounting base are formed on parallel surfaces, the wire bonding operation becomes easy. FIG. 24 shows a magnetic head formed in this way and a head mounting base for supporting this magnetic head.

A pad support portion 64b having a surface 64c parallel to the terminal exposing face 2a of the magnetic head 1 is mounted on the main surface 64a of the head mounting base 64, and the bonding pads 65 and 66 are attached to the surface 64c of the pad support portion 64b. Since the terminals 5 and 6 and the bonding pads 65 and 66 are positioned on surfaces which are parallel with each other, the work of connecting the terminals to the pads with the bonding wires 67 and 68 becomes easier than in the previously described example.

A specific preferred embodiment of the invention is described above, but various modifications may be added to this preferred embodiment based on the technological concept of the invention.

For example, a thin film coil may be formed on only one of the pair of head halves instead of on both of them. Also, the terminals can be in a plane other than the magnetic gap formation surface plane.

Suitable materials and shapes other than those described above can be used for the components constituting the magnetic head. Furthermore, the invention is also applicable to magnetic heads for audio and other uses as well as those for VTRs.

Because in a magnetic head based on this invention the terminal portions connected to the thin film coil are exposed on a plane intersecting with the main surface of the magnetic head at an obtuse angle, the work of connecting conductors to these terminal portions is easy and the reliability of these connections is high. As a result, it is possible to mass-produce magnetic recording/reproducing equipment with high reliability.

What is claimed is:

1. A magnetic head having a magnetic gap in a gap portion and upper and lower parallel surfaces disposed in planes transverse to the plane of said magnetic gap, comprising a pair of bases facing each other to define said magnetic gap therebetween wherein:

each said base comprises a stepped structure having a thin portion bounded by said upper and lower surfaces and a thick portion, said gap is positioned between said upper and lower surfaces in said thin portion, a thin film coil is formed on at least one of the bases and a terminal portion connected to the thin film coil is formed on this base in its thick portion, the terminal portion comprising at least a pair of terminals for connecting the thin film coil to a circuit, a thick portion of the other base is cut away and the terminal portion is exposed at this cutaway thick portion, the terminal portion is formed at the cutaway thick portion on a surface facing said other base and intersecting the plane of said upper surface of the magnetic head at an obtuse angle, the terminal portion exposed by said cutaway thick portion and said cutaway thick portion are positioned on the same side of said upper surface, while said gap portion is positioned on an opposite side of said upper surface, and said lower surface is configured to be secured to another surface.

2. A magnetic head according to claim 1, wherein a thin film coil is formed on each of the bases.

3. A magnetic head according to claim 1, wherein the magnetic head is for azimuth recording.

* * * * *